Patented Nov. 28, 1944

2,363,803

UNITED STATES PATENT OFFICE 2,363,803

PACKING COMPOUND FOR STUFFING BOXES

George T. Randolph, Owensboro, Ky.

No Drawing. Application April 25, 1942, Serial No. 440,559

5 Claims. (Cl. 252—14)

This invention relates to a packing compound for stuffing boxes of oil well pump rods, water pump rods and packing purposes generally.

The principal object of the invention is to provide a packing compound which is an efficient substitute for the rubber packing rings commonly employed, and in many respects superior to rubber, in that it is self-lubricating, therefore, longer lasting, that it lubricates the moving parts against which it bears, preventing corrosion and pitting and prevents excessive wear to itself due to the attrition of rough moving parts, that it avoids wastage inasmuch as it is never necessary to throw away worn portions thereof, as in the case of worn rubber rings, it being essential merely to add a make-up quantity of the compound from time to time to the stuffing box to compensate for depletion due to normal wear.

Another object of the invention is to provide a packing compound composed of pieces of material having the elastic shape-resuming characteristic of rubber but to a less degree than rubber, greater plasticity than rubber, and being self-lubricating and externally slippery whereby said pieces move laterally relative to one another, filling voids and becoming a substantially homogeneous mass when subjected to pressure applied in a direction at an angle to their direction of sliding movement.

A further object of the invention is to provide packing of the type described, in which the pieces or flakes are substantially flat, facing the direction of applied pressure, and substantially beveled at their ends to facilitate their assuming an interleaved relation as a result of their lateral sliding movement.

Other objects of the invention will appear as the following description of a preferred and practical embodiment thereof proceeds.

In the following specification the invention will be described in connection with the packing of an oil well pump rod, although as has been above suggested, the packing compound is of general utility.

The stuffing box at the top of the casing head is customarily packed with a plurality of rubber rings fitting about the reciprocable pump rod and being compressed into sealing engagement with the pump rod by the ring nut or follower of the stuffing gland. While the well is pumping oil, the pump rod is lubricated by the oil, and undue wear of the rubber packing rings does not occur. However, most wells pump oil intermittently. When the oil level has been reduced to a certain point, gas pressure or the pressure of the underlying salt water predominates and the well for a time will pump gas or water. At these times the pump rod is not lubricated. In the case of gas, it rubs with dry friction against the packing rings, subjecting them to excessive wear, heating and perhaps burning. In the case of salt water, not only is the lubrication of the packing rings and pump rod deficient, but the salt water corrodes the pump rod, roughening it or pitting it so that it acts like an active abrasive against the packing rings, quickly wearing them out.

There is a limit to the number of times the packing rings can be recompressed into sealing relation with the pump rod before they are worn beyond the stage of usefulness. Then the stuffing gland must be opened, the old rubber rings discarded and replaced with new rings. Perhaps four-fifths of the original amount of rubber is still in the discarded rings. This represents economic inefficiency and a waste of rubber. The subject invention proposes a packing compound which is an efficient substitute for the rubber rings. It is at all times self-lubricating, therefore, subjecting the parts with which it is associated, to minimum heating and wear; it has the elastic characteristic of rubber, so that it tends to resume its shape when compressed and therefore functions as an active sealing medium, and it is more plastic than rubber so that it does not have to be introduced into the stuffing gland in preformed units, but may be introduced in a somewhat desultory manner, in mass, and automatically takes the shape of the stuffing gland, filling the voids and sealingly engaging the pump rod responsive to the pressure of the follower.

The basic material of my new packing compound is fresh pork rind. This differs from rawhide, in that the latter is the skin of cattle and is dense, substantially impervious, and has little fat content, while pork rind is largely made up of fat globules; its water content is high, and when the water is removed it is quite porous.

In converting the pork rind into the subject packing compound it is first cut into suitably sized pieces. These may take the form of flat strips, punched-out split disks or spiral sections. In the ensuing description the strip material will be used as the preferred form. In carrying out the process of manufacture the fresh pork rind is first partially dehydrated either by refrigeration or pressing out the moisture. The degree of dehydration is not critical, but in general it may be stated that some dehydration is necessary in order to increase the porosity of the pork rind to enable it to take up or absorb certain of the ingredients of the packing.

After partial dehydration, the pork rind is cut into strips an inch or so wide, and the strips are cut into short pieces. The width of the strips and the length of the pieces are immaterial to the invention.

A list of the ingredients and the proportionate quantities used in making a batch of my packing compound may be as follows:

| | |
|---|---|
| Partially dehydrated fresh pork rind cut into strips or small pieces_____lbs__ | 50 |
| Salt_____lbs__ | 2 |
| Benzoate of soda_____lb__ | ½ |
| Powdered graphite_____lbs__ | 5 |
| Liquid tallow at 120°_____gallon__ | ¾ |
| Flake graphite_____lbs__ | 5 |

The pork rind pieces are put into an agitator with the salt and benzoate of soda and stirred until the pork rind pieces are thoroughly impregnated with the ingredient salts. The object of the salt is to draw moisture from the pork rind to more quickly dissolve the benzoate of soda and to cause the benzoate of soda solution to penetrate throughout the mass of the pork rind. The object of the benzoate of soda is as a preservative to prevent the pork rind going rancid. While it is possible within the contemplation of the process to introduce the powdered graphite simultaneously with the salt and benzoate of soda, it is preferred to add the powdered graphite in a subsequent step, immediately following the impregnation of the pork rind by the salt and benzoate of soda. Agitation is continued until the powdered graphite has been thoroughly incorporated into the pores of the pork rind. The object of the graphite is to add materially to the self-lubricating quality of the packing compound.

After the incorporation of the powdered graphite, the liquid tallow is added and agitation continued. The temperature of the liquid tallow is immaterial, being solely for the purpose of liquefaction and it should be high enough to keep the tallow liquid throughout the agitation step. The purpose of the tallow is two-fold. One function is to waterproof the packing compound, and the other to add to its lubricating quality.

The loading of the pork rind with the graphite and tallow prevents shrinkage of the pork rind.

After the tallow has been thoroughly incorporated by agitation, the flake graphite is added which coats the surfaces of the pork rind pieces. It is characteristic of flake graphite that the particles lap one another and constitute a slick or slippery surface, which enables the pork rind pieces to slip upon one another under the application of pressure, filling the voids in the packing mass and forming a substantially homogeneous seal.

All of the ingredients, with the exception of the tallow, are preferably at room temperature during the process of manufacture.

It is important to add the powdered graphite before the tallow, otherwise the latter would occupy all of the pores in the pork rind to the exclusion of the powdered graphite.

In cutting the strips into the pieces, the cuts may be made perpendicular to the plane of the strip, but are preferably made in such a way as to leave the ends of the pieces beveled. This facilitates their riding over one another when sliding laterally under the urge of pressure applied endwise of the stuffing gland.

The pork rind pieces treated according to the process of the present invention have the elastic shape-resuming characteristic of rubber, so that they resist compression and press actively against the pump rod as well as against the surfaces of the stuffing box which they contact. They have this shape-resuming characteristic, however, to a less degree than rubber, so that they can be compressed indefinitely into sealing relation to the parts. They are more plastic than rubber, so that they can be compressed into a substantially homogeneous mass.

In applying the packing compound to a stuffing gland, the pieces are laid in the stuffing gland with their flat sides uppermost, in an otherwise more or less desultory arrangement. The ring nut or follower is then screwed down, transmitting pressure through the pieces. By virtue of their slick surfaces of flake graphite, and in some instances by the added virtue of their tapered ends, the pieces slide laterally or circumferentially upon one another within the gland, filling all voids and becoming massed in a substantially homogeneous body.

The packing compound is self-lubricating, due to the impregnation of tallow and powdered graphite lubricating the pump rod irrespective of whether the pump is working in oil, gas, or water, whereby wear on the packing is minimized, as well as wear and corrosion of the pump rod. When the packing compound becomes so worn that the seal between the packing compound and pump rod becomes inefficient, it is merely necessary to screw down on the follower, and this routine may be repeated until the packing becomes so depleted through normal wear that no further compression is practicable. It is then unnecessary to discard the packing compound remaining in the gland. It is essential merely to open the gland and add a sufficient make-up quantity of the packing compound which, when the follower is screwed down completely, renews the efficiency of the seal.

The packing compound is at all times subject only to normal wear. Due to the presence of the tallow, it will not wash away, and it will keep fresh and unspoiled indefinitely due to the presence of the benzoate of soda.

While I have in the above description disclosed what I believe to be a preferred and practical embodiment of the invention, it will be understood to those skilled in the art that the specific proportions of the several ingredients as herein disclosed are not critical but merely illustrate what I have found to be a thoroughly satisfactory and efficient packing compound.

What I claim is:

1. Packing compound comprising flat pieces of fresh untanned pork rind loaded with powdered graphite and tallow, said pieces having substantially beveled ends and being coated with flake graphite producing a slippery surface whereby contiguous pieces slide laterally relative to one another when subjected to pressure upon their flat sides, the beveled ends of said pieces permitting them to override one another in the course of their lateral movement.

2. Packing compound comprising pieces of flat fresh untanned pork rind impregnated with a preservative and loaded with powdered graphite and tallow, said pieces being coated with flake graphite producing a slippery surface whereby contiguous pieces slide laterally relative to one another when subjected to pressure in a direction substantially perpendicular to their direction of sliding movement.

3. Packing compound comprising flat pieces of fresh untanned pork rind having their edges beveled and said pieces impregnated with a preservative and loaded with powdered graphite and tallow, said pieces being coated with flake graphite producing a slippery surface whereby contiguous pieces slide laterally relative to one another, the beveled edges of said pieces permitting them to override one another in the course of their sliding movement.

4. Process of making packing compound comprising partially dehydrating fresh untanned pork rind strips loading said partially dehydrated strips with powdered graphite and liquid tallow, in the order named, and coating said loaded strips with flake graphite.

5. Process of making packing comprising partially dehydrating fresh untanned pork rind strips to reduce the moisture content and producing interstitial pores, impregnating said strips with benzoate of soda as a preservative, loading said strips with powdered graphite and liquid tallow in the order named, and coating said strips with flake graphite.

GEORGE T. RANDOLPH.